No. 617,007. Patented Jan. 3, 1899.
E. BAUSCH & A. KOEHLER.
MICROSCOPE.
(Application filed Mar. 26, 1898.)
(No Model.) 3 Sheets—Sheet 1.
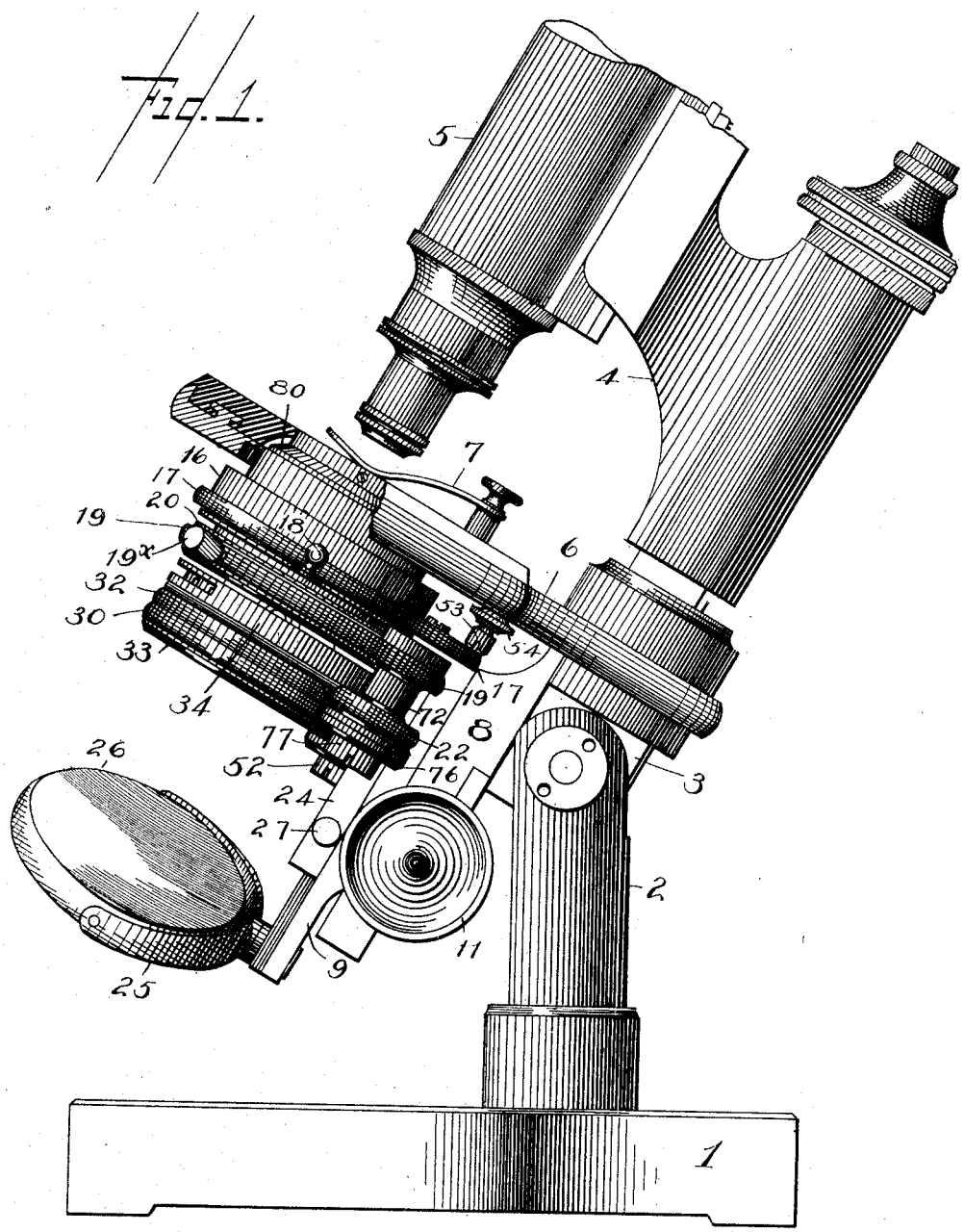

No. 617,007. E. BAUSCH & A. KOEHLER.
MICROSCOPE.
(Application filed Mar. 26, 1898.)

(No Model.) 3 Sheets—Sheet 2.

Patented Jan. 3, 1899.

Witnesses.
GWillard Rich.
Chas. F. Logan.

Inventors:
Edward Bausch
August Koehler
by Church & Church
their Attorneys.

No. 617,007. Patented Jan. 3, 1899.
E. BAUSCH & A. KOEHLER.
MICROSCOPE.
(Application filed Mar. 26, 1898.)
(No Model.) 3 Sheets—Sheet 3.
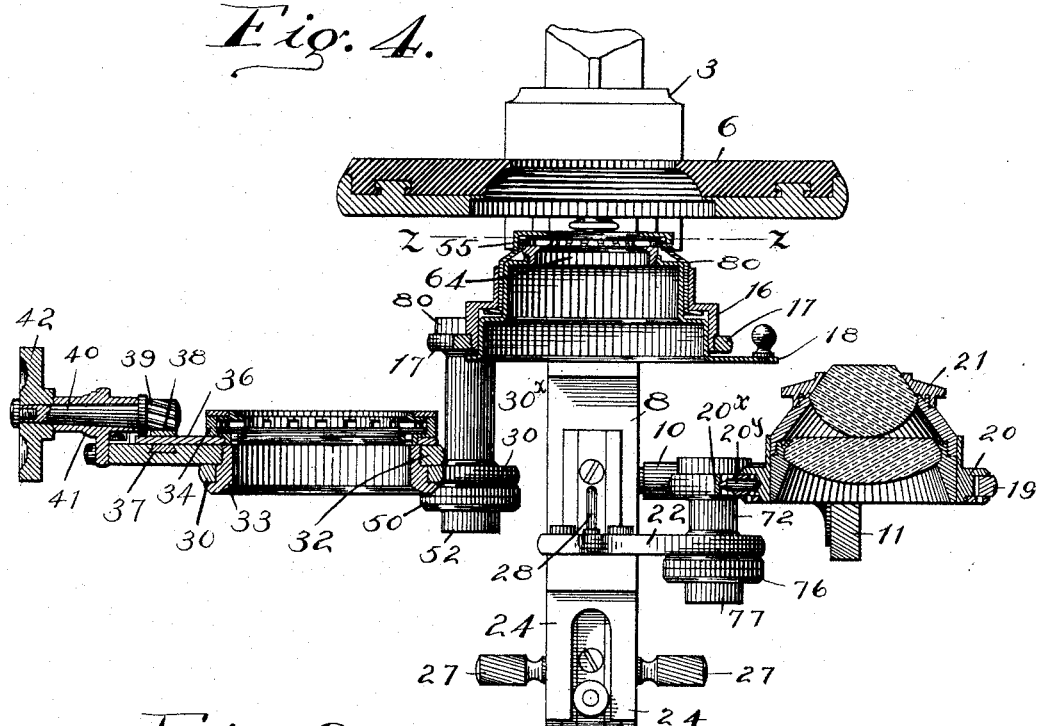
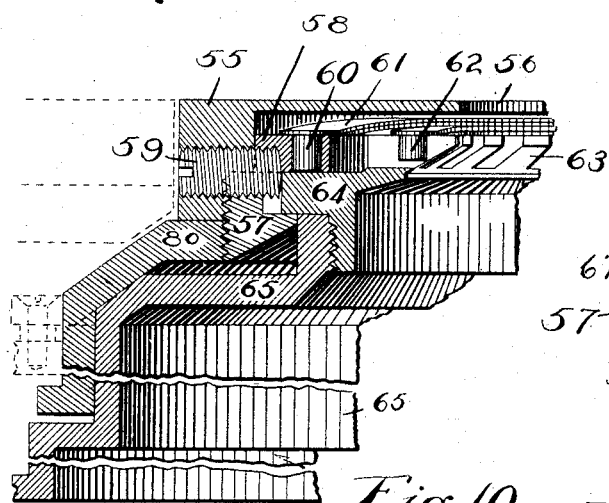
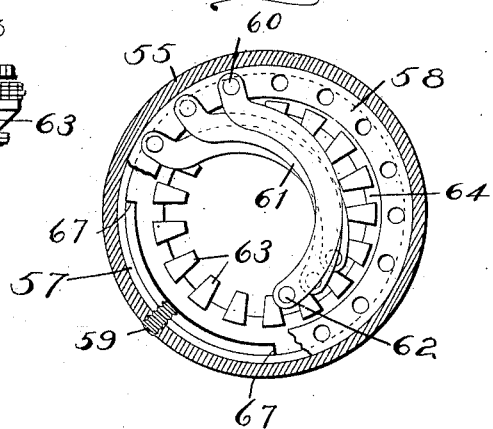
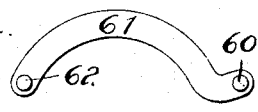
Witnesses.
G. Willard Rich.
Chas. F. Logan.
Inventors
Edward Bausch
& August Koehler
by
Church & Church
Attorney.

UNITED STATES PATENT OFFICE.

EDWARD BAUSCH AND AUGUST KOEHLER, OF ROCHESTER, NEW YORK, ASSIGNORS TO THE BAUSCH & LOMB OPTICAL COMPANY, OF SAME PLACE.

MICROSCOPE.

SPECIFICATION forming part of Letters Patent No. 617,007, dated January 3, 1899.

Application filed March 26, 1898. Serial No. 675,302. (No model.)

*To all whom it may concern:*

Be it known that we, EDWARD BAUSCH and AUGUST KOEHLER, of Rochester, in the county of Monroe and State of New York, have invented certain new and useful Improvements in Microscopes; and we do hereby declare the following to be a full, clear, and exact description of the same, reference being had to the accompanying drawings, forming a part of this specification, and to the reference-numerals marked thereon.

Our present invention relates to improvements in microscopes, and particularly to the substage thereof, and has for its object to provide a complete substage which is small enough to be convenient, rigid enough to withstand constant wear and at the same time not be out of proportion to the microscope, and which enables all the required adjustments to be had without detaching any of the parts from the instrument; and it further consists in the provision of an improved diaphragm or stop particularly applicable for use in a microscope beneath the stage, but capable of other uses, and which is simple in construction and not liable to get out of order, and also in an improved adjustment for relatively-movable parts of an instrument of this character; and to these ends the invention consists in certain improvements, the novel features being pointed out in the claims at the end of this specification.

Referring to the drawings, Figure 1 is a side elevation of a portion of a microscope, showing the application of our new substage; Fig. 2, a front elevation of the same; Fig. 3, a sectional view taken on the line *x x* of Fig. 2, looking upward; Fig. 4, a vertical sectional view on the line *y y* of Fig. 3; Fig. 5, a section on the line *a a* of Fig. 2; Fig. 6, a section on the line *b b* of Fig. 2; Fig. 7, a section on the line *c c* of Fig. 2; Fig. 8, an enlarged sectional view of the diaphragm; Fig. 9, a sectional view on the line *z z* of Fig. 4, looking downward; Fig. 10, a plan view of one of the diaphragm-leaves; Fig. 11, a side elevation of the same.

Similar reference-numerals indicate similar parts.

1 indicates the base of a microscope to which our improvement is shown attached, having the standard 2, to which a main arm 3 is pivoted.

4 is the adjustable arm, 5 the tube, and 6 the stage or table attached to the arm 3 and provided with the usual object-slide-holding springs 7. This stage may be of any suitable construction, but is preferably such a one as is shown in Patent No. 577,344.

8 indicates an extension connected to the lower end of the main arm and adapted to receive a slide or carriage 9, on which the complete substage is mounted and which is arranged to be moved vertically by the spindle 10, having the outer milled head 11 and a spiral pinion 12 on its inner end, located in a recess formed in the extension 8 and coöperating with a rack-bar 13 on the slide, having spiral diagonally-arranged teeth. The connection between the carriage and the bar 8 (shown particularly in Figs. 3 and 5) is formed by providing the outer surface of the bar with the inclined sides 14, upon which the correspondingly-shaped rear side of the carriage operates, and beneath these inclined surfaces is provided an undercut recess for the reception of the laterally-extending flanges of a bar 15, secured in a recess in the front of the carriage, the rack, with which the pinion 12 on the shaft 10 coöperates, being inserted in a recess in the bar 15, so that the teeth are substantially flush with the rear face of the bar 15, and the bearing between the carriage and its supporting-bar may be ground and accurately adjusted, the inclined faces and the upper portion of the flanges on the bar 15 being the only bearing portions. By locating the rack-bar 13 in the face of bar 15 and locating the pinion in a recess of the arm extension 8 the thickness of the parts is materially reduced and the rack is accurately held in the recess, and being separate from the bar 15 it can be made of steel instead of brass, of which the other parts are composed, thus preventing undue wear. We prefer to employ the spiral rack and pinion for causing this adjustment by reason of the fact that several of the teeth are in engagement at once and they operate by a "shearing motion," so to say, thereby insuring a more even movement than can be accomplished with an ordinary rack and a pinion having radial teeth. This means of adjustment may be applied to other parts of a microscope, the part having the ways and lateral recesses (in this instance the extension 8) constituting the female member and the carriage, which has the bar 15, constituting the male member, and thus the advantages of adjustment and also of the reduction in thickness of the parts are accomplished.

The substage is composed of three general parts arranged one above the other and all attached to the carriage 9. The upper part consists of a ring 16, having its upper part slit and secured to or forming part of a plate 17, attached to the upper end of the slide 9 and carrying a removable iris-diaphragm. The casing or shell of this diaphragm is indicated by 80, and 18 indicates the handle for manipulating it, the specific construction of the diaphragm being described later on. Suffice it to say that its leaves are adapted to be brought substantially parallel with the upper surface of the stage and that the stage itself is recessed to permit the diaphragm-casing to come directly in contact with the object-slide and the leaves very close thereto, if desired, thus being in the most effective position for use without a condenser. When the condenser is in use, the diaphragm may be used to limit the volume of light entering the objective without limiting the angle of the illuminating-cone, this method of controlling the light being of the utmost importance in the examination of highly-refractive transparent bodies, such as living bacteria, diatoms, and similar objects.

The middle section of the substage consists of a frame for a condenser and embodies an arm 19, having an aperture, within which is arranged a ring 20, in which the condenser 21 is removably fitted, said ring being centered by screws $19^x$, passing through the arm and engaging the ring, and a spring $20^x$ operating through a pin $20^y$ on the ring to hold it against the screws, which may be adjusted to accurately position and center the condenser. This arm 19 is pivoted upon the end of a laterally-extending arm 22, attached to the condenser-slide 24, vertically movable in a guide on the main slide 9. The pivotal connection between the arms 19 and 22 may be of any desired construction; but we prefer that shown particularly in Figs. 2 and 7, from which it will be seen that the arm 19 is provided with a pivot-pillar 70, rigidly secured to it by a screw 71, and the arm 22 with a spacing-sleeve 72, on which rests a shoulder 73 on the pillar. The sleeve 72 is provided beneath the arm 22 with the segmental recess 74, with which coöperates a stop-pin 75 on a washer 76, secured to the pillar by a screw 77 and rotating therewith. This construction permits the condenser to be swung beneath the diaphragm or out at one side. The lower end of the condenser-slide 24 is bifurcated to pass over the shank of the yoke 25, carrying the reversible mirror 26, and is provided with operating handles or arms 27 and also with a stop-pin 28 on the upper side, adapted to contact with the frame 17 of the upper diaphragm to limit the upward motion of the slide. The condenser is capable of swinging laterally to the left of the instrument, so as to be entirely out of the path of rays from the mirror, and is also perfectly free for changing accessories, and when swung inward its support is arrested by the stop-pin 75, with the condenser in line with the optical axis of the instrument, and is vertically adjustable on the slide 9, so that the condenser may be brought in immersion contact with the object-slide if the diaphragm be removed or be placed in any other position desired without reference to the position of the upper iris-diaphragm.

The lower section of the substage embodies the support for the large iris-diaphragm used below the condenser, said support consisting of an arm 30, having a sleeve $30^x$ attached thereto and pivoted upon a downwardly-extending pin or pillar 31, attached by means of the screw 80 to the left side of the frame 17, carrying the upper diaphragm. 50 indicates a washer or collar fitting upon the lower end of the pivot-pin 31 and turning with it and held by means of a screw 52, entering the lower end of the pin, as shown particularly in Fig. 6, said washer having a stop-pin 81 thereon, operating in a slot formed in the lower end of the sleeve and serving to limit the movements of the arm on the pivot. In the present embodiment this diaphragm embodies a ring-frame 32, resting upon the top of the arm 30 and held to turn therein by means of a collar 33, having a flange extending below the arm 30, as shown in Fig. 4, so as to be rotarily adjustable on the arm. 34 indicates the diaphragm-casing, secured to the support or plate 36, which is provided at one side with a dovetailed projection 37, operating in a groove formed in the extension of the frame 32, the upper portion of said plate 36 being provided with a rack 38, preferably having diagonal teeth, with which coöperates a corresponding pinion 39 on the end of the arbor 40, journaled in a bearing or sleeve 41, secured to the end of the frame 32, said arbor having at its outer end an operating-head 42. As the frame or plate 32 is rotarily adjustable on the supporting-arm and the diaphragm-frame is laterally adjustable on said plate, it will be seen that the diaphragm when beneath the condenser may be rotated on its own axis and moved laterally by the rack and pinion when oblique illumination is required.

The upward movement of the substage as a whole is limited by the adjustable stop-screw 53 on the under side of the stage, provided with a lock-nut 54, as shown particularly in Fig. 1.

From the above construction it will be seen that the condenser and lower diaphragm may be moved to one side and the upper diaphragm used alone, if desired, and in substantially the plane of the top of the stage, also that the condenser may be used with or without either or both diaphragms, or either of the diaphragms may be used without the condenser, as may be desired, the arrangement of parts being such that the adjustments are easily effected and the parts not in use located out of the way of the operator.

While we prefer that the substage shall carry the parts described, it will be understood that as the condenser and both diaphragms are capable of removal from their supporting arms and plates other substage accessories could be substituted for those shown and used singly or in combination, as desired.

The upper iris-diaphragm involves several new features, and is particularly desirable for use in substantially the plane of the surface of the stage, the construction being shown in Figs. 8 and 9 of the drawings, to which reference is now particularly had. The extreme upper portion of the diaphragm-casing consists of a casing section or ring 55, having an inwardly-extending flange 56 to cover the ends of the diaphragm-leaves, and the lower portion of which is provided with the internal thread adapted to receive a corresponding thread upon the exterior of a confining or holding ring 57, screwing into it, and upon which latter is screwed the shell 80, supporting the device and, in the embodiment shown in Fig. 4 and in full lines in Fig. 8, held within the ring 16 by friction alone. Arranged within the casing section or ring 55 and beneath the flange 56 thereof is the pivot-supporting ring 58, held in position by a small screw 59, passing through the side of the casing-section 55 and engaging correspondingly-threaded apertures in the rings 57 and 58, as shown in Fig. 8, thereby preventing the rotation of both of said rings when adjusted. If desired, several of these screws 59 may be employed; but we find in practice that one is ample for all practical purposes, and therefore have shown the section in Fig. 5 as taken through this securing-screw. The pivot-ring 58 is provided with suitable vertically-extending apertures or recesses adapted to receive the pivot-pins 60 of the diaphragm-leaves 61, said leaves being shaped as shown in Figs. 10 and 11 and being also provided with pins 62 on their under sides and at the ends opposite the pivot-pins 60. These diaphragm-leaves are arranged to overlap, as usual in such devices, and the free or outer ends extend across the aperture in the diaphragm-support, and the pins 62 play in slots between inwardly-projecting fingers 63 formed on a rotatable operating-ring 64, held against the under side of the pivot-ring 58 by means of the inwardly-projecting flange on the holding collar or ring 57, said ring 64 being rotated by the shell 65 screwing upon its lower end, and in the present construction formed with the operating-handle 18. Instead of the fingers slots in the under side of the ring 64 would answer for moving the free ends of the leaves. The rotary movement of said ring is limited by the stop pin or screw 59, adapted to engage the shoulder 67 at the end of the recess formed in ring 64, as shown in Fig. 9. By this arrangement we are enabled to place both the pivot and operating pins on the same side of the diaphragm-leaves, which enables the leaves to be brought close against the object and in substantially the plane of the upper side of the stage, thereby materially decreasing the thickness of the diaphragm as a whole, and further enables the condenser to be used through the diaphragm in oil-immersion contact with the slide, if desired. The advantage of such a diaphragm as described is apparent, as it is thus in the only position at which the volume of light entering the objective can be varied without changing the aperture of the illuminating-cone. If it is desired to use such a diaphragm upon an ordinary adjustable substage, the supporting-shell 80 could be provided with a laterally-extending flange adapted to be secured directly to the upper side of the ordinary substage-ring by means of screws $17^{\times}$, the arms or devices for operating the ring 64 being correspondingly modified to occupy but little space and serving to permit the easy adjustment of the ring and diaphragm, as will be understood.

While the diaphragm described is particularly adapted to use in a microscope and in the plane of the stage, it is capable of other uses, as in photographic shutters or lens-tubes, the construction being such as to permit of its use in other forms of apparatus without change, excepting in the supporting and operating devices.

We claim as our invention—

1. In a microscope, the combination with the main arm and the stage, of the substage-carriage mounted on the main arm and adjustable vertically in a plane parallel with that of the optical axis, the diaphragm-support on the carriage, and the laterally-swinging supporting-arm mounted on the carriage and arranged to be moved into and out of the optical axis of the instrument.

2. In a microscope, the combination with the main arm and the stage, of the adjustable substage-carriage mounted on the main arm, the ring-support on the carriage, and two laterally-swinging supporting-arms adapted to receive attachments connected to the carriage and movable into or out of the optical axis of the instrument.

3. In a microscope, the combination with the stage, of the vertically-adjustable substage-carriage, having the two attachment-supporting arms pivoted thereon, and adapted to be swung laterally into and out of the optical axis of the instrument.

4. In a microscope, the combination with the stage, of the substage-carriage, the two attachment-supporting arms pivoted thereon on axes parallel with the optical axis of the instrument and movable into and out of said optical axis.

5. In a microscope, the combination with the stage, of the vertically-adjustable substage-carriage having an attachment-support rigidly secured thereto, and a second attachment-support pivoted upon said carriage and movable laterally in a horizontal plane into and out of the optical axis of the instrument.

6. In a microscope, the combination with the stage, of the vertically-adjustable substage-carriage having an attachment-support thereon, a slide movable on the carriage, and an attachment-support pivotally mounted on said slide and movable into and out of the optical axis of the instrument.

7. In a microscope, the combination with the stage, of the vertically-adjustable substage-carriage, having an attachment-support secured thereto, an attachment-carrying arm pivoted on the carriage and laterally movable into and out of the optical axis of the instrument, a movable slide mounted on the carriage, and an attachment-carrying arm pivoted thereon and movable into and out of the optical axis.

8. In a microscope, the combination with the stage, of the vertically-adjustable substage-carriage, the diaphragm mounted thereon, the laterally-swinging arm pivotally connected to the carriage, the diaphragm on said arm, the slide adjustable on the carriage, the arm pivoted thereon, and the condenser carried by said last-mentioned arm.

9. In a microscope, the combination with the stage, the vertically-adjustable substage-carriage and the adjustable diaphragm removably mounted thereon, of the slide mounted on the carriage, and a condenser pivotally connected to the slide and adapted to be moved into and out of the optical axis of the instrument.

10. In a microscope, the combination with the stage, of the vertically-adjustable substage-carriage, having the ring thereon, and the diaphragm removably mounted in the ring, the slide movable on the carriage, the laterally-swinging arm pivoted on the slide, and the condenser adjustable on said arm.

11. In a microscope, the combination with the stage, the vertically-adjustable substage-carriage, the ring thereon and the removable diaphragm in the ring, of the laterally-swinging arm pivotally connected to the carriage, the diaphragm adjustable rotarily and laterally of the arm, the slide mounted on the carriage, the laterally-swinging arm thereon, and the condenser mounted on said arm.

12. In a microscope, the combination with the stage, the substage-carriage, the ring thereon, and the shell fitting in the ring, and the diaphragm at the upper end of the shell, of the slide adjustable on the carriage, having the laterally-movable swinging arm, and the condenser thereon adapted to be moved inside the shell.

13. The combination with the stage having the aperture, of an iris-diaphragm arranged in the aperture and substantially in the plane of the upper surface of the stage.

14. The combination with the stage having the aperture, and an iris-diaphragm arranged in said aperture and substantially in the plane of the upper surface of the stage, of a vertically-movable condenser arranged beneath the stage.

15. The combination with the stage, having the aperture, an iris-diaphragm in said aperture and substantially in the plane of the stage-surface, the shell for supporting it and the operating-handle, of a vertically-movable condenser arranged beneath the diaphragm and adapted to be moved with its upper surface into substantially the plane of the stage-surface.

16. The combination with the stage, having the aperture, of the diaphragm-shell projecting through said aperture having its upper surface substantially flush with the upper surface of the stage, the adjustable iris-diaphragm at the upper end of said shell, and the operating-handle below and at one side of the shell for operating the leaves of the diaphragm.

17. In an iris-diaphragm, the combination with the casing, of the pivot-ring having the apertures, the overlapping diaphragm-leaves having the pivot and operating pins on the same faces and at opposite ends, and means for operating said leaves.

18. In an iris-diaphragm, the combination with the casing of the overlapping diaphragm-leaves, each having the pivot and operating pins on the same face, but at opposite ends, and means for actuating said leaves on their pivots.

19. In an iris-diaphragm, the combination of the casing, the ring having the pivot-apertures, the overlapping leaves, each having the pivot and operating pins projecting from the same face and at opposite ends, and the operating-ring having the fingers engaging the operating-pins.

20. In an iris-diaphragm, the combination of the casing, the ring having the pivot-apertures, the overlapping leaves, each having the pivot and operating pins projecting from the same faces and at opposite ends, the ring overlapping the pivot-ring and having the fingers projecting inside the latter, and engaging the operating-pins on the leaves.

21. In an iris-diaphragm, the combination of the casing the pivot-ring having the apertures, the overlapping leaves having the pivot and operating pins, the operating-ring having the fingers and bearing on the pivot-ring, and the confining-ring secured to the casing extending over the operating-ring.

22. In an iris-diaphragm, the combination of the casing, the pivot-ring having the apertures, the overlapping leaves having the pivot-pins, the operating-ring having the fingers, and bearing on the pivot-ring, the confining-ring 57 screwed to the casing and engaging the operating-ring, fastening devices for holding the pivot and confining rings to the casing, the shell engaging the ring 57, and an arm connected to the operating-ring.

23. In an iris-diaphragm, the combination with the casing-section 55, the pivot-ring 58, the leaves having the pivot and operating pins, the operating-ring 64 having the fingers, and the slot, the securing-screw 59 engaging the casing and rings 58 and 64, the supporting-shell 90 and the operating-handle 18 connected to the ring 64.

24. In a microscope, and as a means for connecting relatively-movable sliding members, the combination with a female member having a way with inclined bearing-walls, and undercut recesses at the sides of said way, of the coöperating male member having the correspondingly-inclined walls, and the recess between them, the bar 15 secured in said recess having the laterally-extending flanges operating in the undercut recesses in the female member, said bar also having a recess in its face, a rack-bar therein, and a pinion journaled in the female member coöperating with the rack.

25. In a microscope, the combination with the main-arm extension 8 having the way provided with inclined sides, and the undercut recesses at the sides thereof, of the carriage having the inclined sides fitting the ways, and the recess, the bar 15 arranged in the recess in the carriage, having the laterally-extending flanges, and the recess in its face, and the pinion on the extension 8 engaging the rack.

26. In a microscope, the combination with the stage and a support below it, of an arm for carrying a substage accessory pivoted on the support, said pivotal connection embodying a vertical pin or pillar secured to one of the parts, a bearing-sleeve secured to the other part and encircling the pin, and stops for limiting the relative rotation of the sleeve and pin.

27. In a microscope, the combination with the stage and a support below it, of an arm for carrying a substage accessory pivoted on the support, said pivotal connection embodying a vertical pin or pillar secured to one of the parts, the washer thereon having the stop-pin and the holding-screw, the bearing-sleeve on the other part encircling the pin and having the segmental slot with which the stop-pin coöperates.

EDWARD BAUSCH.
AUGUST KOEHLER.

Witnesses:
L. B. ELLIOTT,
WM. L. PATTERSON.